(12) United States Patent
Scharr

(10) Patent No.: US 7,554,582 B2
(45) Date of Patent: Jun. 30, 2009

(54) DIGITAL IMAGE PROCESSING METHOD AND DEVICE FOR CMOS CAMERA IMAGES

(75) Inventor: Hanno Scharr, Heidelberg (DE)

(73) Assignee: Forschungszentrum Julich GmbH, Julich (DE)

( * ) Notice: Subject to any disclaimer, the term of this patent is extended or adjusted under 35 U.S.C. 154(b) by 537 days.

(21) Appl. No.: 10/538,702

(22) PCT Filed: Nov. 28, 2003

(86) PCT No.: PCT/DE03/03939

§ 371 (c)(1),
(2), (4) Date: Jun. 10, 2005

(87) PCT Pub. No.: WO2004/055727

PCT Pub. Date: Jul. 1, 2004

(65) Prior Publication Data

US 2006/0139467 A1    Jun. 29, 2006

(30) Foreign Application Priority Data

Dec. 13, 2002    (DE) .............................. 102 58 662

(51) Int. Cl.
  *H04N 5/217*    (2006.01)
(52) U.S. Cl. ........................................ 348/241
(58) Field of Classification Search ............. 348/222.1, 348/341, 342, 348, 241, 242, 248; 250/208.1; 378/19

See application file for complete search history.

(56) References Cited

U.S. PATENT DOCUMENTS

| | | | |
|---|---|---|---|
| 5,392,211 A | | 2/1995 | Oe |
| 5,517,544 A | * | 5/1996 | Levinson ........................ 378/4 |
| 5,530,238 A | * | 6/1996 | Meulenbrugge et al. .. 250/208.1 |
| 5,644,610 A | * | 7/1997 | Crawford et al. .............. 378/19 |
| 5,923,722 A | | 7/1999 | Schulz |
| 6,177,957 B1 | * | 1/2001 | Anderson .............. 348/231.99 |
| 6,295,331 B1 | * | 9/2001 | Hsieh ........................... 378/19 |
| 7,003,071 B2 | * | 2/2006 | Nagaoka et al. ................ 378/19 |
| 2004/0267507 A1 | * | 12/2004 | Stierstorfer ................. 702/194 |
| 2005/0104978 A1 | * | 5/2005 | Shinotsuka ............ 348/231.99 |

FOREIGN PATENT DOCUMENTS

GB    2 239 572    7/1991

\* cited by examiner

*Primary Examiner*—Timothy J Henn
(74) *Attorney, Agent, or Firm*—Andrew Wilford

(57) ABSTRACT

A digital image in CMOS camera images is processed by first generating an output signal g from a CMOS camera. Then its spatio-temporal gradient $(g_x, g_y, g_t)$ is derived from the output signal. A time constant c and a local object shift $(u_x, u_y)$ are established from prior knowledge. Finally a target signal value q is calculated from the output signal g as $$q=(g_x*u_x)+(g_y*u_y)+(g*-1*c)+g_t.$$

8 Claims, 1 Drawing Sheet

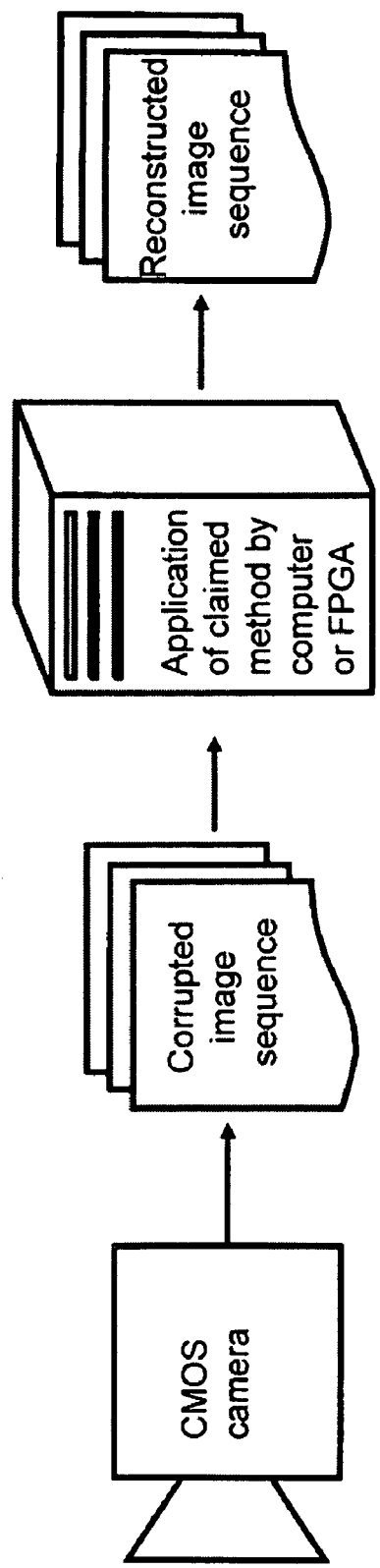

DIGITAL IMAGE PROCESSING METHOD AND DEVICE FOR CMOS CAMERA IMAGES

CROSS REFERENCE TO RELATED APPLICATIONS

This application is the US national phase of PCT application PCT/DE2003/003939, filed 28 Nov. 2003, published 1 Jul. 2004 as WO 2004/055727, and claiming the priority of German patent application 10258662.4 itself filed 13 Dec. 2002, whose entire disclosures are herewith incorporated by reference.

FIELD OF THE INVENTION

The invention relates to a method as well as to a device for the digital image processing of CMOS camera images.

BACKGROUND OF THE INVENTION

To be able to process images with a computer system they must be converted to a data format which is computer compatible. This conversion is called digitalizing in digital image processing. The original image data is transformed into a computer-conforming data format. The transformations can be available as two-dimensional or multidimensional functions for the processing. Upon the taking of the picture, a continuous scene is spatially discretized. One possible mathematical description of digitalizing image data uses a notation in the form of image matrices. The image S (the scene S) is a rectangular matrix (image matrix) $S=(s(x, y))$ with image rows and image columns. The row index is x and the column index is y. The image point (pixel) at a location (row, column) $=(x, y)$ determines the gray value $s(x, y)$. Thus elemental regions of the scene are each imaged as a pixel of the image matrix. For digitalizing the image data, a rastering (grid, scanning) and quantizing are required. In the rastering, the image to be digitalized is subdivided into area segments of the raster by superimposing on the image a rectangular or square grid. In the quantizing each area segment of the raster is assigned a gray value $s(x, y)$ of a gray scale G. The determination of this gray value can be effected point by point or by averaging over the raster area.

To acquire digital image data, apart from CCD cameras, in many cases CMOS cameras are also used. These cameras are most commonly employed in science and industry, for example to take pictures of crashes and for monitoring rapid technological procedures in production. CMOS (Complementary Metal Oxide Semiconductor) cameras have, by comparison to CCD image sensors, a higher brightness dynamic as well as higher permissible operating temperatures. The light particle (photon) impinging on the photodiodes of the CMOS camera are converted into electric currents. The light-sensitive photodiodes are associated with a plurality of transistors. The CMOS camera pixels determine their gray values (signal) from the actual photo current of the photodiodes. Each pixel clan be individually read and evaluated. This enables optional access to the respective image part of interest and has special advantages in industrial image processing. With the aid of CMOS cameras, very high image rates can be produced (extreme time magnification). The access time for individual pixels are thus naturally very short, that is the actual photo current has available only a very short time constant.

At high contrast and with objects that are moving or objects which are rapidly changing, at high image rates the not yet decayed strong currents from prior bright image regions tend to dominate the later darker signal regions. The "parasitic" capacities which are contained in the pixel circuit (see [4] (T. Seiffert, Measurement Processes and Parameters for Estimating the Dynamic Contrast Resolution Properties of Electronic Cameras, Diploma Dissertation, Kahlsruhe University (TH), 2001), heading 8.3, give rise to a blurring in time of the pixel signal. This effect is in the context of the present invention, referred to as a capacitive afterglow effect. The very high gray value resolutions of the camera which result from the usual logarithmic treatment is thus greatly reduced or highly error-prone values are supplied. If a bright signal, for example, moves over a relatively dark background, for example a weld point over a sheet metal workpiece, a tail is formed behind it (compare [4], page 37). This tail overlies the dark background. For example in the welding of sheet metal, one must be able to monitor the weld seam directly behind the weld point and thus it is necessary to wait until the tail has disappeared from the seamed region.

There are many possibilities for correction of this detrimental effect of capacitive afterglow upon the speed of the image acquisition:

By a moderate background lighting, the discharge of bright pixels can be significantly accelerated. If the direction of movement is known, with certain applications it is possible to detect the position of real objects or of projected patterns which can be analyzed with respect to the movement direction, that is one can detect the rapid change from dark to bright. These processes however are suitable only for certain applications when for example lighting or the overall image acquisition situation is known or controllable. The indicated strategy for evaluation cannot reconstruct nonvisible signal components but rather will only ignore or bypass them.

The evaluation of optical processes, for example, like the decay of the temperature in thermal images is carried out by means of mathematical models. Thus, for example, from [3] (Horst W. Haussecker and David J. Fleet, Computing Optical Flow with Physical Models of Brightness Variation IEEE Trans. PAMI, Vol. 23, No. 6 pp 661-673, June 2001), FIG. 9, the use of a differential equation (DGL) is known. In these processes the physical characteristics of the image acquisition is described in a differential equation and unknown parameters of this differential equation are numerically approximated. Known local approximation methods include, among others "ordinary least squares (OLS)", "total least squares (TLS)" and "mixed OLS-TLS" [5] ©. Garbe, Measuring Heat Exchange Processes at the Air-Water Interface from Thermographic Image Sequence Analysis, Doctorate Dissertation, Heidelberg University, 2001), all of which are special forms of the least square method and can be drawn from any standard work dealing with numerological methods. Furthermore, so-called variation methods with data and smoothing procedures are used (see for example [1]: B. Jahne, Digital Image Processing, $4^{th}$ volume, Springer, 1997, and [6]: (J. Weickert and C. Schnorr, Variational Optic Flow Computation with a Spatio-Temporal Smoothness Constraint, Technical Report 15/2000 Computer Science Series, July 2000).

The use of corresponding methods for the evaluation of CMOS camera images has not been previously described in the literature.

OBJECT OF THE INVENTION

It is thus an object of the invention to provide a method and device by means of which an improved digital image processing of CMOS camera images is possible.

SUMMARY OF THE INVENTION

This object according to the invention is attained in that the variation in time of the output signal value g is a combination of the term c*g and the source term q and the calculation of the target signal value q comprises the subtraction of the term c*g from the variation in time of the output signal value g of the image data, c being a decay constant.

With the method and device of the invention, it is possible immediately to obtain a rapid and direct evaluation of moving images with high contrast and without the capacitive afterglow effects which have led to a delayed or prolonged evaluation. It is possible to evaluate the actual photo current without capacitive afterglow effects which cannot be avoided for physical reasons. It is also possible to reconstruct high dynamic changes from bright to dark (higher contrast) for example in high-speed image acquisition. It is possible to evaluate intensities with minimum influence of afterglow in a quantitative manner.

BRIEF DESCRIPTION OF THE DRAWING

The invention is described as shown in the sole FIGURE of the attached drawing.

SPECIFIC DESCRIPTION

The relationship between capacities, photo currents and image data can be given for moving objects with the aid of a partial linear differential equation (1) in gray values which can be formulated as follows:

$$\frac{dg(x, y, t)}{dt} = c(x, y, t)g(x, y, t) + q(x, y, t) \Leftrightarrow \quad (1)$$

$$\frac{\partial g}{\partial x}u_x + \frac{\partial g}{\partial y}u_y + \frac{\partial g}{\partial t} - c(x, y, t)g(x, y, t) - q(x, y, t) = 0$$

In this equation:
g=the gray value of the image sequence
c=the decay constant (normally negative)
q=source term of interest (light)
u=local (object) shift u=(dx/dt, dy/dt).

The gray value g of the image sequence represents the uncorrected image data directly supplied by the CMOS camera. It is a singular output signal. The expression "output signal value" is to be understood as meaning, hereinafter, the entire measurement signal g produced by the photon current.

The decay constant c is the physical parameter which corresponds to the discharge velocity of the capacitances in the CMOS camera, that is the discharge speed of the camera circuit capacity. The quantity of charge which has flowed away from the camera capacity between readout processes is given by the expression c*g.

The source term q is the charge at a point in time t resulting from the photo current g. Thus q is the target signal of interest.

By the subtraction of the term c*g from the variation with time of the output signal value g, the actual photo current without the capacitive afterglow effect, namely, the source term q can be determined, that source term q being referred to hereinafter as the target signal value.

An advantageous feature of the invention is characterized in that a parameter estimation or approximation is carried out. This method step is especially suitable for image data with high contrast since here the afterglow effects are relevant. These regions can be rapidly and simply detected, for example by means of the local contrast measurements described in [1]: B. Jahne, Digital Processing, 4th Volume, Springer, 1997, by a threshold segmentation. If one limits the parameter estimation to these regions, a significant acceleration of the computation can be achieved.

From the literature reference [3] (Horst W. Haussecker and David J. Fleet, Computing Optical Flow with Physical Models of Brightness Variation IEEE Trans. PAMI, Vol. 23, No. 6, pp 661-673, June 2201), the "total least squares (TLS)" method of general parameter estimation in partial differential equations of this type is known. The method is characterized in that, for example, it enables this parameter estimation to be carried out. However, other estimation methods are also suitable, especially those partly described above and known parameter estimation processes like for example the "ordinary least squares (OLS)" or the "mixed OLS-TLS" and/or variability methods.

In an advantageous feature of the method, the source term q is obtained with the aid of a parameter estimation technique like for example the method of "total least squares" [3] Horst W. Haussecker and David J. Fleet, Computing Optical Flow with Physical Models of Brightness Variation IEEE Trans. PAMI, Vol. 23, No. 6, pp 661-673, June 2001, from the ordinary output signal value. For this purpose the above given differential equation (1), is used. From the starting signal g, by means of discrete convolutions with derivative kernels, the space-time derivatives of g are determined. These and all previously known parameters, for example from calibration steps or image accession conditions, are fed into the equation (1). From the thus resulting system of equations, q (x, y, t) is obtained by parameter estimation.

An advantageous refinement of the method according to the invention is characterized in that the decay constant c can also be determined by parameter estimation or approximation.

An advantageous refinement of the method according to the invention is characterized in that the decay constant c can be determined by a prior calibration of the CMOS camera. In that case it may be determined by parameter estimation. As a consequence, an acceleration of the process is enabled. The decay constant c is under sufficiently constant operating conditions, only a magnitude which does not vary with time and is dependent upon the camera, that is c=c (x, y). With good homogeneity of the pixel, c=const. The decay constant c can thus be calculated also off-line in a calibration step.

An advantageous refinement of the method according to the invention is characterized in that the object movement u can also be determined by parameter estimation. The already known object movements need not be approximated. The parameters $u_x$ and $u_y$ can then be introduced into the differential equation (1). The parameter approximation is thereby simplified and accelerated.

An advantageous refinement of the method is characterized in that the method according to the invention is implemented with the aid of FPGA's (Field Programmable Gate Arrays). If one limits the output signal value to image segments which are not too large, it is then possible to achieve image rates of several images per second.

The invention relates further to a device for digital image processing in CMOS cameras which is characterized in that it is suitable to carry out the method according to the invention.

LITERATURE

[1]: B. Jahne, Digital Processing, $4^{th}$ volume, Springer, 1997.
[2]: B. Jahne, H. Haussecker, P. Gleissler (EDS.) Handbook of Computer Vision and Applications, Volume 1. Sensors and Imaging, Academic Press, 1999.
[3]: Horst W. Haussecker and David J. Fleet, Computing Optical Flow with Physical Models of Brightness Variation IEEE Trans. PAMI, Vol. 23, No. 6, pp 661-673, June 2001.
[4]: T. Seiffert, Measurement Method and Parameters for Estimating the Dynamic Contrast Resolution Properties of Electronic Cameras, Diploma Dissertation, Karlsruhe University (TH), 2001.
[5]: C. Garbe, Measuring Heat Exchange Processes at the Air-Water Interface from Thermographic Image Sequence Analysis, Doctoral Dissertation, Heidelberg University, 2001.
[6]: J. Weickert and C. Schnorr, Variational Optic Flow Computation with a Spatio-Temporal Smoothness Constraint, Technical Report 15/2000 Computer Science Series, July 2000.

The invention claimed is:

1. A method of digital image processing in CMOS camera images, the method comprising the steps of:
generating an output signal g from a CMOS camera;
deriving from the output signal g its spatio-temporal gradients ($g_x$, $g_y$, $g_t$);
establishing a time constant c and a local object shift ($u_x$, $u_y$) from prior knowledge; and
calculating a target signal value q from the output signal g as $q=(g_x*u_x)+(g_y*u_y)+(g*-1*c)+g_t$.

2. The method according to claim 1 wherein for regions of the image data with high contrast, a parameter estimation or approximation is carried out.

3. The method according to claim 2 wherein for the parameter estimation or approximation, the "total least squares" (TLS), "ordinary least squares" (OLS), "Mixed OLS-TLS" and/or variation methods is used.

4. The method according to claim 1 wherein the decay constant c and/or the object shift u is determined by parameter approximation from the image data.

5. The method according to claim 1 wherein the decay constant c is determined by calibration of the camera.

6. The method according to claim 1 wherein known object movements $u_x$ and $u_y$ are introduced directly into the differential equation (1).

7. The method according to claim 1 wherein field programmable gate arrays (FPGA's) are used.

8. The method according to claim 1 wherein the target signal value q, the constant c, the x component $u_x$ of the local object shift u, or the y component $u_y$ of the local object shift u is derived by parameter estimation.

* * * * *